United States Patent [19]

Tsukada

[11] Patent Number: 5,149,205
[45] Date of Patent: Sep. 22, 1992

[54] DUST SEAL DEVICE OF LINEAR GUIDE APPARATUS

[75] Inventor: Toru Tsukada, Maebashi, Japan

[73] Assignee: Nippon Sieko Kabushiki Kaisha, Tokyo, Japan

[21] Appl. No.: 720,600

[22] Filed: Jun. 25, 1991

[30] Foreign Application Priority Data

Jun. 26, 1990 [JP] Japan .................................. 2-67635

[51] Int. Cl.⁵ .............................................. F16C 29/06
[52] U.S. Cl. ..................................................... 384/15
[58] Field of Search ..................... 384/15, 45, 43, 44; 464/168

[56] References Cited

U.S. PATENT DOCUMENTS

| 4,918,846 | 4/1990 | Tsukada | 384/15 |
| 4,921,358 | 5/1990 | Kasuga et al. | 384/15 |
| 5,087,130 | 2/1992 | Tsukada | 384/15 |
| 5,092,685 | 3/1992 | Tonogai | 384/45 |

FOREIGN PATENT DOCUMENTS 63-103623 7/1985 Japan .

*Primary Examiner*—Lenard A. Footland
*Attorney, Agent, or Firm*—Basile and Hanlon

[57] ABSTRACT

A dust seal device for a linear guide apparatus includes a pair of side seals and a pair of under seals. The side seal includes a pair of side surface side seals slidably in contact with side surfaces of a guide rail and an upper surface side seal slidably in contact with an upper surface of the guide rail. Each of these side seals has a seal holding plate made of a steel plate, a seal member secured to one long edge of the seal holding plate, and a spring portion formed on the other edge of the holding plate by cutting and bending an end portion of the holding plate. Each of the under seals also includes a holding plate and a seal member, with a spring portion formed in the holding plate. A pair of seal fixing plates are provided so that the side seals and/or the under seals are attached respectively to end caps through the seal fixing plates. Each seal fixing plate is made of a double-fold steel plate having seal sandwiching gaps to hold the seal holding plates of the side seals and/or the under seals inserted therein.

2 Claims, 9 Drawing Sheets

FIG. 8(a)  FIG. 8(b)
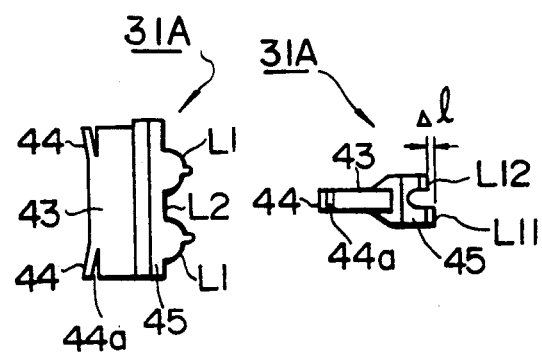
FIG. 9(a)  FIG. 9(b)
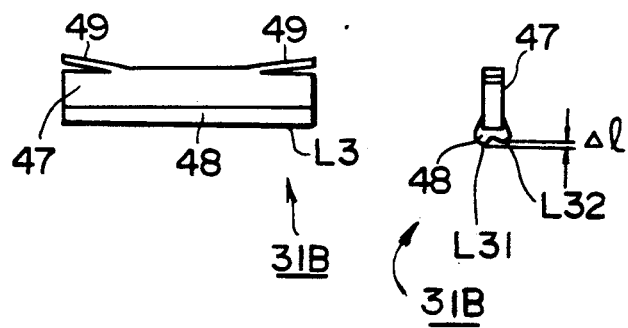

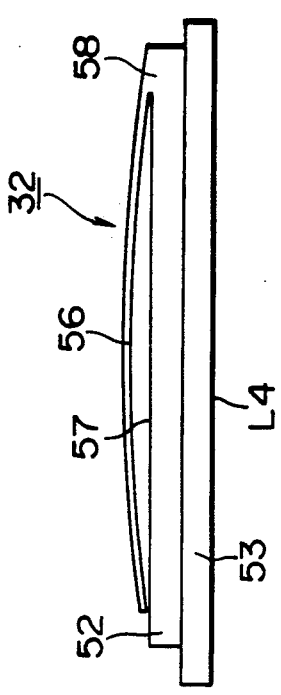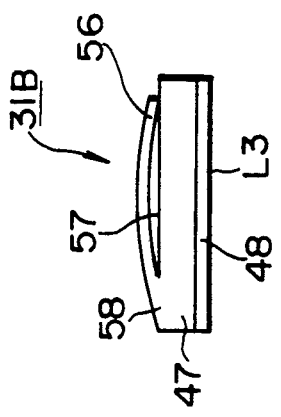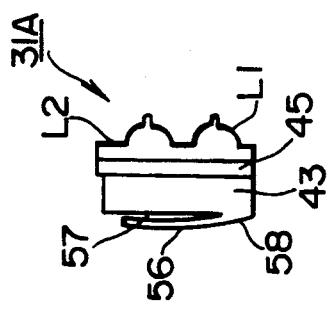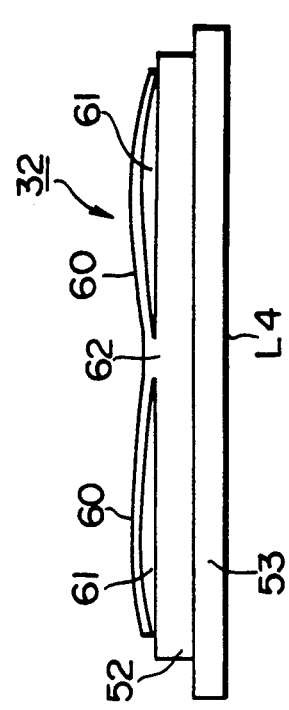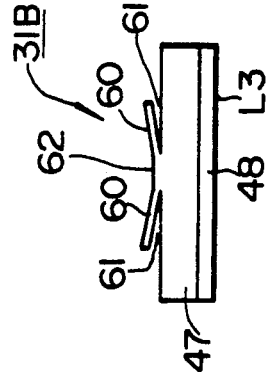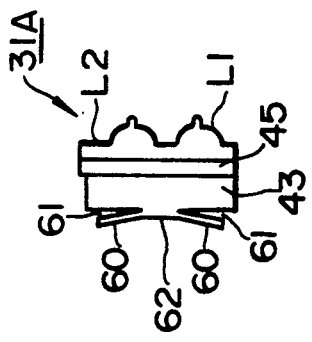

DUST SEAL DEVICE OF LINEAR GUIDE APPARATUS

BACKGROUND OF THE INVENTION

1. Field of the Invention

The present invention relates to a dust seal device of a linear guide apparatus used in a machine tool, an industrial machine, and the like, and, in particular, to an improvement in the attaching structure of side seals and under seals which are components of the dust seal device.

2. Description of the Prior Art

With reference to FIG. 18, generally, a linear guide apparatus includes a long, axially extending guide rail 1 and a slider 2 having a substantially inverted U-shaped cross section and movably straddling the guide rail 1. The guide rail 1 has ball rolling grooves 3 formed in both side surfaces. A main body 2A of the slider 2 has ball rolling grooves 5 formed in inner surfaces of both side walls 4 so that the ball rolling grooves 5 respectively oppose the ball rolling grooves 3 of the guide rail 1 as shown in FIG. 19. A plurality of balls 6 are loaded in the opposed ball rolling grooves 3 and 5 such that the slider 2 is movable in an axial direction through the rolling of the balls 6. With the movement of the slider 2, the balls 6 interposed between the guide rail 1 and the slider 2 are moved while rolling to an end of the slider main body 2A. In order to continuously move the slider 2 in the axial direction, it is necessary to circulate the balls 6. Accordingly, a through bore 7 is formed in each of the side walls 4 of the main body 2A as a ball return passage. At the same time, end caps 2B having a substantially inverted U-shaped cross section are attached to opposite ends of the main body 2A. A pair of U-shaped curved paths 8 are formed in each of the end caps 2B to respectively bring the ball rolling grooves 3 and 5 into communication with the ball return passage 7. As a result, an endless ball circulating path is formed by the ball rolling grooves 3 and 5, the curved path 8, and the ball return passage 7. Furthermore, as shown in FIG. 18, the letter g denotes a grease nipple and, in FIG. 19, the letter H denotes a retainer for preventing the balls 6 from falling off when the slider 2 is removed from the guide rail 1.

When foreign matter, such as dust, chips, cuttings, and the like, intrudes into a gap between the guide rail 1 and the slider 2 straddling the guide rail 1 and is deposited on the ball rolling grooves and the like, the smooth movement of the balls 6 is disturbed. Accordingly, a side seal 10 is usually attached by small screws n to an outer end surface 2c of each end cap 8 to prevent the foreign matter from intruding from opposite end portions of the slider 2. At the same time, under seals 11 are attached to lower surfaces of the slider 2 to seal gaps between the side surfaces 1b of the guide rail 1 and the lower surfaces of the slider 2 and to thereby prevent foreign matter from entering from the lower gaps.

FIG. 20 shows an example of a prior art structure for attaching the side seal 10 and the under seal 11.

The side seal 10 has an inverted U-shaped front shape similar to that of the end cap 2B and is formed by molding a nitrile rubber on a steel plate. As a result, a rubber seal portion 12 is formed on an inner edge of an opening 21. Furthermore, inserting bores 14 are formed in an outer periphery of the rubber seal 12 in registration with screw inserting bores 13 formed in the end cap 2B. Reference number 16 denotes a nipple fixing bore which is formed in registration with a grease nipple fixing screw bore 15 formed in the end cap 2B. Small screws n are inserted through the inserting bores 14 and are tightened into engagement with the screw inserting bores 13. In this manner, the side seal 10 is fixed in place and seal lips L are slidably in contact with an upper surface 1a and side surfaces 1b of the guide rail 1 to seal opposite end sides of the slider 2.

Each under seal 11 is formed of an elastic sheet of a rectangular strip shape and has a length substantially equal to the length of the slider main body 2A, and a width slightly larger than the width of the lower end surface 17 of the slider main body 2A. Three fixing bores 18 are formed in the under seal 11 at spaced intervals in an axial direction. On the other hand, rivet bores 19 corresponding to the fixing bores 18 are formed in each lower end surface 17 of the slider main body 2A. The under seal 11 is applied to the end surface 17 of the slider main body 2A and fixed in place by inserting rivets 20 into the rivet bores 1 after passing through the fixing bores 18. A seal lip L of the fixed under seal 11 is slidably in contact with the side surface 1b of the guide rail 1 to provide sealing of the lower side of the slider 2.

However, in such a prior art dust seal device, or a dust seal structure of the side seals and the under seals of a linear guide apparatus, the following problems are encountered.

Each of the side seal 10 and the under seal 11 achieves the sealing effect only by an elastic deformation of the rubber material. As a result, due to non-uniform properties resulting from manufacturing and assembling processes, a seal clamping margin is excessively large and the operability is deteriorated by an increased frictional resistance. Furthermore, the rubber wears and the amount of elastic deformation is decreased. Thus, the sealing effect is lost at an early stage of use.

The side seal 10 is unitary molded by wrapping a mandrel of a steel plate with a rubber. As a result, a dimensional error often occurs and the contact with a surface to be sealed becomes non-uniform and partial wear is apt to result.

The under seal 11 is fixed by rivetting. Thus, the number of operations and the number of assembling processes are increased. In addition, when the pitch between the fixing bores 18 of the under seal 11 and the rivet bores 19 deviates, the under seal 11 becomes wavy. Further, when the intensity of caulking of the rivets 20 is too large, an edge of the under seal 11 will be turned. Thus, the assembling is unstable and the sealing properties become non-uniform.

SUMMARY OF THE INVENTION

The present invention was made in view of the problems in the prior art and it is an object of the invention to provide a dust seal structure of a linear guide apparatus which employs a constant preload exerted by spring elasticity in place of a preload by elasticity of rubber to thereby prevent deterioration of the sealing function at an early stage of use due to wear of the rubber, which enables the seal structure to be able to absorb a dimensional error to a greater extent, and which allows the seal structure to be mounted and demounted reliably and easily.

A dust seal structure of the present invention is used with a linear guide apparatus. The linear guide apparatus includes a long guide rail extending in an axial direction and having ball rolling grooves formed in both side surfaces and a slider movably straddling the guide rail. The slider includes a slider main body having ball rolling grooves which are respectively formed in inner surfaces of side walls thereof respectively opposing the ball rolling grooves of the guide rail. The slider main body further has ball return passages penetrating through thick wall portions of the side walls in parallel with the ball rolling grooves in the inner surfaces of the side walls. End caps are respectively joined to opposite ends of the slider main body. Each of the end caps has a pair of curved paths for bringing the ball return passages into communication with the ball rolling grooves. A plurality of balls are rollably inserted into the ball rolling grooves.

The dust seal structure comprises two pairs of side seals respectively attached to opposite end surfaces of the end caps for sealing the front and rear openings of gaps between the slider and the guide rail and, further, comprises a pair of under seals for sealing the lower openings of gaps between the guide rail and the slider. At least one of the side seal and the under seal has a seal member secured to one end edge of a seal holding plate and has a spring portion on an opposite end edge to load a constant pressure preload onto the seal member. A pair of seal fixing plates are fixed respectively to end surfaces of the end caps. Each of the seal fixing plates has a seal sandwiching gap which opens and confronts a surface of the guide rail to be sealed. The seal holding plate of the side seal or the under seal is inserted into the seal sandwiching gap so that at least the side seals or the under seals are mounted to the end caps through the seal fixing plates.

Each of the side seal and the under seal has two stages of seal lips including a front stage lip and a rear stage lip. The protruding lengths of the front stage lip and the rear stage lip toward the surfaces to be sealed are slightly different from each other.

As described above, each of the side seals and the under seals is elastically pressed against the surfaces of the guide rail to be sealed by an elastic force of a spring portion. By virtue of this arrangement, each seal is applied with a constant pressure preload. Accordingly, even when the seal member is worn, as compared with the prior art using only the rubber elasticity for sealing, the period in which the sealing function is effectively functioning is extended to a greater extent.

The side seal is not a unitary member, as is the case in the prior art, since it includes an upper portion and both side portions. These upper portion and both side portions are formed of separate members. The under seal is also formed of two separate members. As a result, even when dimensional errors are present between the ball rolling grooves of the guide rails, and between the upper surface and the ball rolling grooves, any dimensional errors will be absorbed by each individual seal and the occurrence of non-uniformity of the sealing performance due to wear in each portion is reduced.

BRIEF DESCRIPTION OF THE DRAWINGS

FIGS. 8a and 8b are respectively a front view and an upper view of the rail side surface side seal;

FIGS. 9a and 9b are respectively a front view and an upper view of the rail upper surface side seal;

FIG. 12 is a front view of a rail side surface side seal of a second embodiment of the present invention;

FIG. 13 is a front view of a rail upper surface side seal of a second embodiment of the present invention;

FIG. 14 is a plan view of an under seal of the second embodiment of the present invention;

FIG. 15 is a front view of a rail side surface side seal of a third embodiment of the present invention;

FIG. 16 is a front view of a rail upper surface side seal of a third embodiment of the present invention;

FIG. 17 is a plan view of an under seal of the third embodiment of the present invention;

DESCRIPTION OF THE PREFERRED EMBODIMENTS

Figure 1:
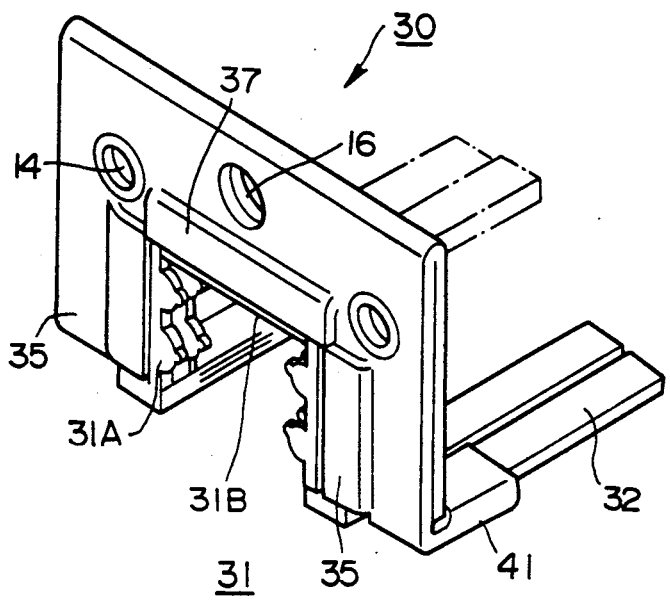
FIG. 1 is a perspective view of a seal mounting portion of a first embodiment of the present invention.
Figure 2:
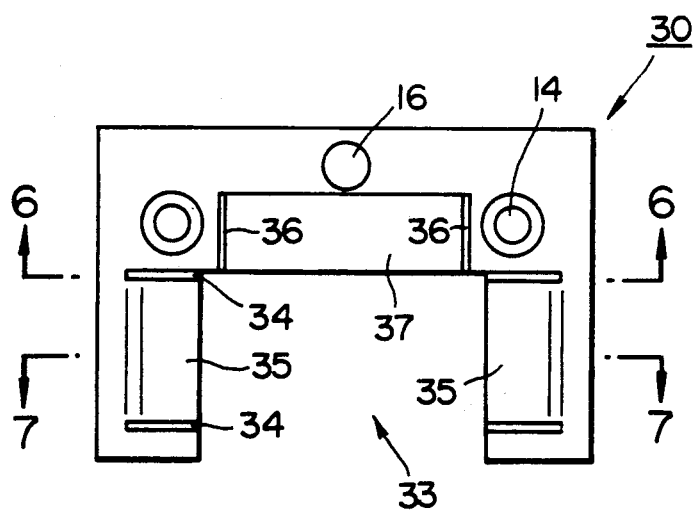
FIG. 2 is a front view of a seal fixing plate shown in FIG. 1.
Figure 3:
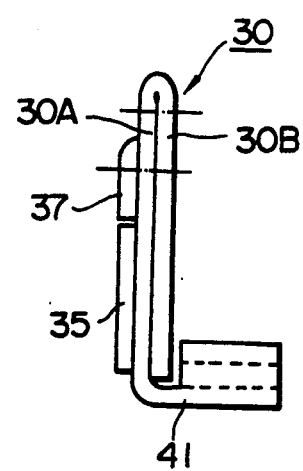
FIG. 3 is a side view of the fixing plate shown in FIG. 2.
Figure 18:
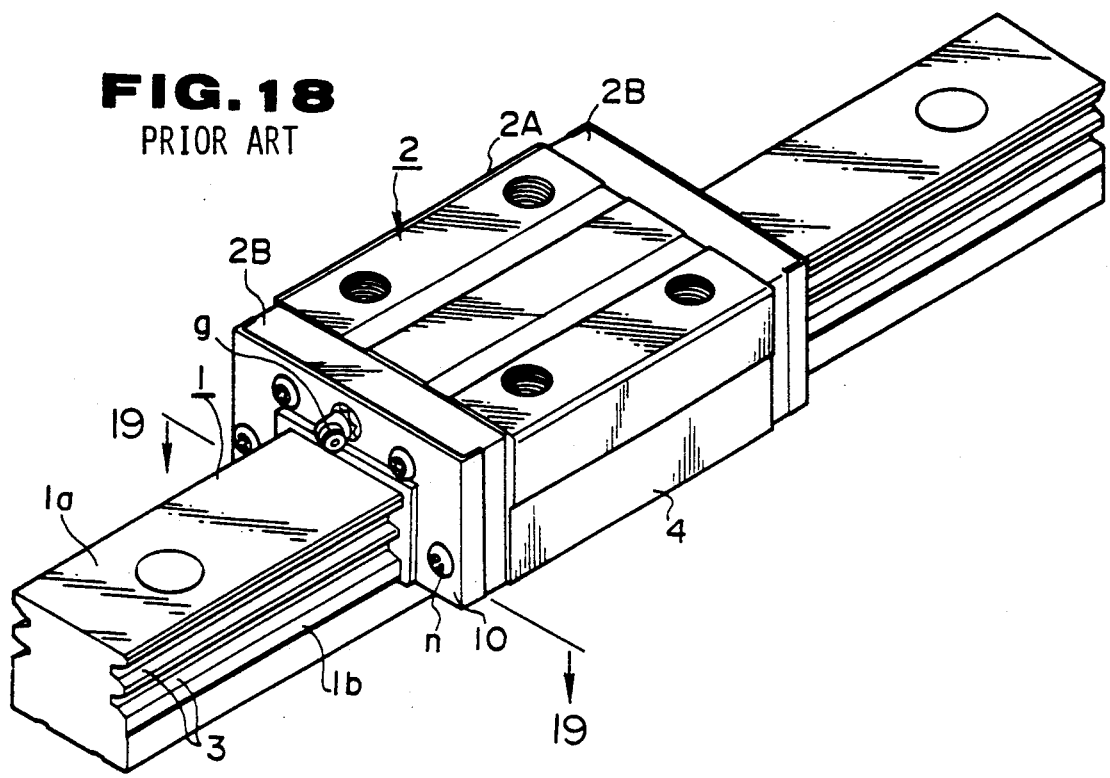
FIG. 18 is a perspective view of a prior art linear guide apparatus.
Figure 19:
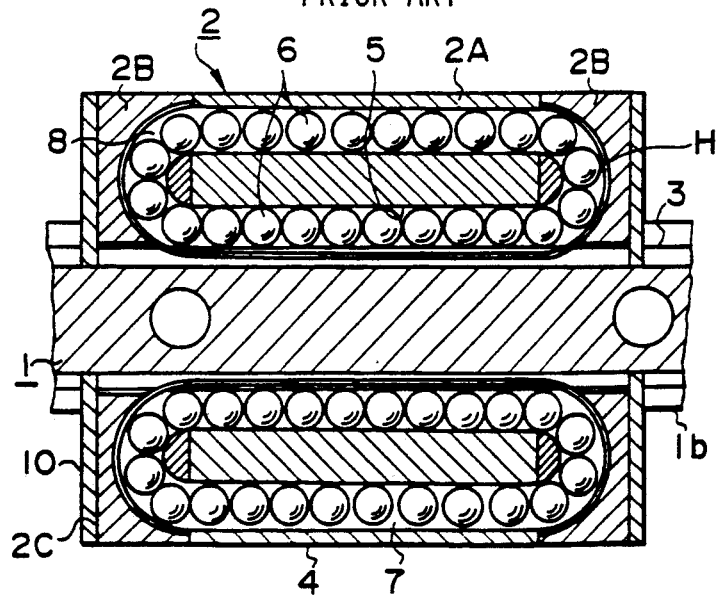
FIG. 19 is a cross sectional view taken along line 19—19 in FIG. 18.
Figure 20:
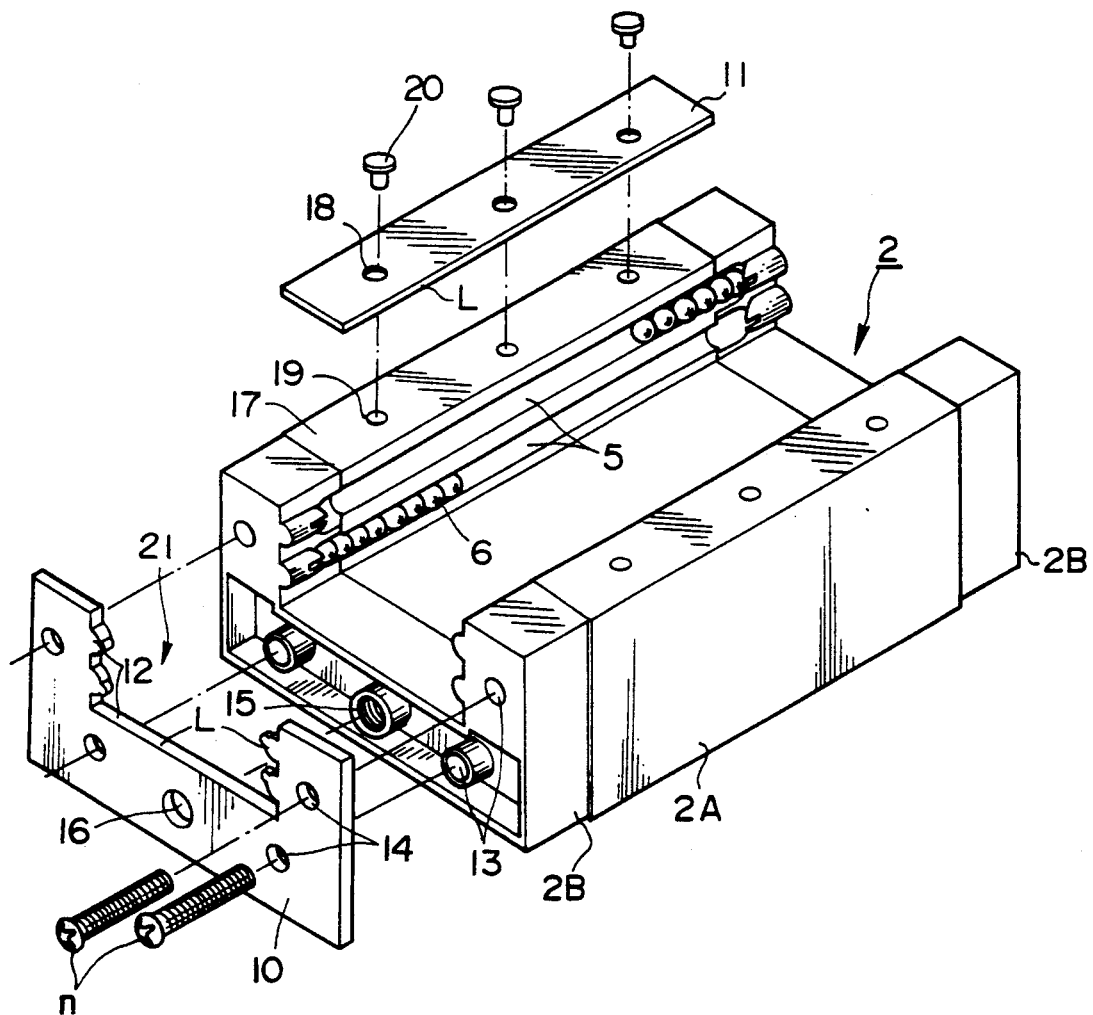
FIG. 20 is an exploded perspective view illustrating a way of mounting a prior art under seal to a slider.

Embodiments of the invention will be described with reference to the drawings in which like or equivalent parts to that of the prior art described above and shown in FIGS. 18, 19 and 20 are designated with like numerals throughout the drawings. FIGS. 1 to 11 show a first embodiment of the invention. FIG. 1 is a perspective view showing a side seal 31 consisting of a pair of rail side surface side seals 31A, a rail upper surface side seal 31B, and a pair of under seals 32 mounted to a seal fixing plate 30.

Figure 6:
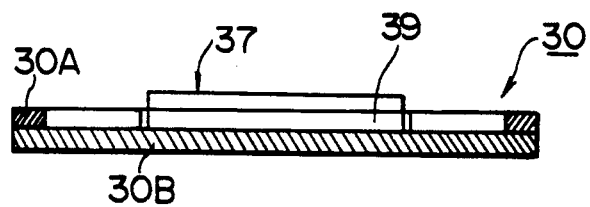
FIG. 6 is a cross sectional view taken along line 6—6 in FIG. 2.
Figure 7:
FIG. 7 is a cross sectional view taken along line 7—7 in FIG. 2.

The seal fixing plate 30, as shown in FIGS. 2 to 7, is formed by stamping and folding into a double thickness steel plate. The seal fixing plate 30 has a front shape in the form of a substantially inverted U-shape corresponding to an inverted U-shape of an end cap 2B and has a recessed portion 33 which opens downwardly. A front plate 30A of the double-folded plate 30 has cuts 34 in each of two side leg portions facing the recessed portion 33. A side expanded portion 35 is formed by bending a portion between the cuts 34 to expand outwardly. Furthermore, cuts 36 are made in an upper portion of the fixing plate 30 facing the recessed portion 33. An upper expanded portion 37 is formed by bending a portion between the cuts 36 to expand outwardly. Each of the side expanded portions 35 has a gap 38 between the side expanded portion 35 and a rear plate 30B for sandwiching a seal therebetween, as shown in FIG. 7. Similarly, the upper expanded portion 37 has a seal sandwiching gap 39 formed between the upper expanded portion 37 and the rear plate 30B as shown in FIG. 6.

Figure 4:
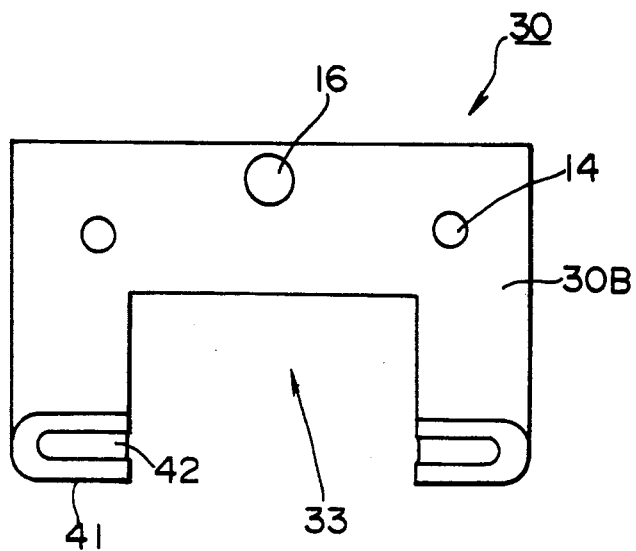
FIG. 4 is a rear view of the fixing plate shown in FIG. 2.
Figure 5:
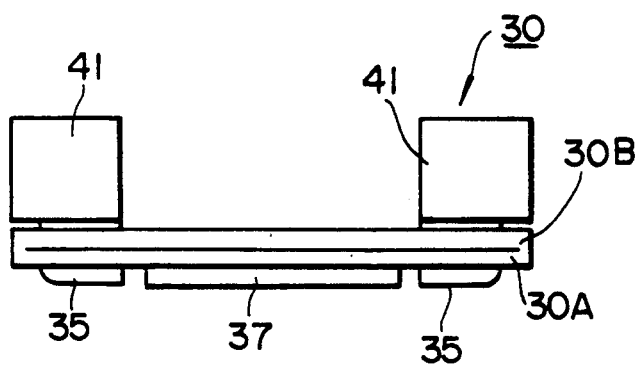
FIG. 5 is an upper view of the fixing plate shown in FIG. 2.

The seal fixing plate 30 has lower bent portions 41 formed by bending lower portions of the side leg portions backwardly at right angles and, further, by bending laterally extending pieces of the lower portions of the side leg portions inwardly in a U-shape so that an under seal sandwiching gap 42 is formed in each of the lower bent portions 41 as shown in FIG. 4.

In FIGS. 1, 8a and 8b, there is shown the rail side surface side seal 31A. The side seal 31A is formed of a seal holding plate 43 made of a rectangular steel plate, spring portions 44 formed at opposite ends of one long side of the seal holding plate 43, and a seal member 45 secured to the other long side of the seal holding plate 43 by means of welding or the like. The spring portion 44 is formed by making a cut in an end portion of the seal holding plate 43 along the long side thereof and by turning the cut piece outwardly. This spring portion 44 is used for the purpose of applying a constant pressure preload to the seal member 45.

The seal holding plate 43 has a size and a thickness substantially matched with the size of the seal sandwiching gap 38 of the side leg portion of the seal fixing plate 30. The seal member 45 is formed by molding an elastic material, such as a rubber, plastic, etc. Protruding lips L1 which are slidably in contact with the ball rolling grooves 3 of the guide rail 1 and a lip L2 which is slidably in contact with the side surface 1b of the guide rail 1 are provided in the seal member 45. The protruding lip L1, as shown in FIG. 8b, is formed with two stage-lips including a front stage seal lip L11 and a rear stage seal lip L12 with a small gap interposed therebetween. Protruding lengths of the two stage seal lips L11 and L12 are different from each other by a minute size difference of Δl.

The pair of rail side surface side seals 31A are respectively attached to the both side leg portions of the seal fixing plate 30.

FIGS. 9a and 9b show the rail upper surface side seal 31B. The side seal 31B is formed of a seal holding plate 47 made of a rectangular steel plate, a seal member 48 secured to an edge of one long side of the seal holding plate 47 by means of welding or the like, and spring portions 49 formed by cutting end portions of the other long side of the seal holding plate 47 and turning the cut end portions outwardly to separate them from the other long side.

The seal holding plate 47 has a size and a thickness substantially matched with the seal sandwiching gap 39 of the seal fixing plate 30. The seal member 38 is made by molding an elastic material, such as a rubber or plastic. The seal member 48 has a lip L3 which is slidably in contact with the upper surface 1a of the guide rail 1. The protruding lip L3 is formed with a two-stage lip including a front stage seal lip L31 and a rear stage lip L32 spaced from the front stage lip L31 by a minute gap. Protruding lengths of the front stage seal lip L31 and the rear stage seal lip L32 are different from each other by a small size difference of Δl.

Figure 10A:
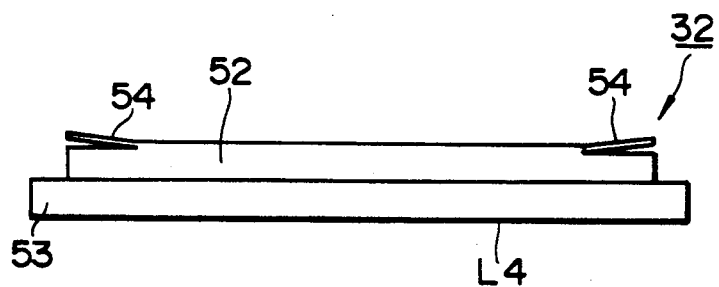
FIGS. 10a, 10b, and 10c are respectively a plan view, a side view, and a front view of the under seal.
Figure 10B:
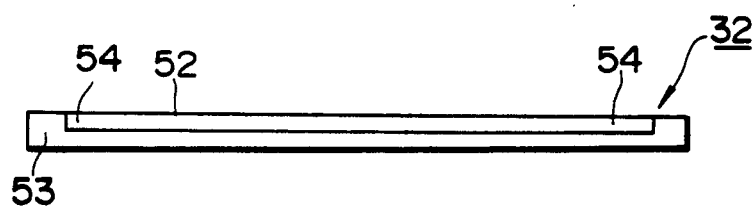
Figure 10C:
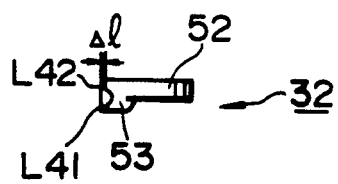

FIGS. 10a, 10b, and 10c show the under seal 32. The under seal 32 includes a seal holding plate 52 made of a rectangular steel plate, a seal member 53 secured to an edge of one long side of the seal holding plate 52, and spring portions 54 formed by cutting end portions of the other long side of the seal holding plate 52 and turning the cut portions outwardly in a similar manner as described with respect to the rail side surface side seal 31A and the rail upper surface side seal 31B.

The seal holding plate 52 has a plate thickness and a width size matched with a width and a depth of the under seal sandwiching gap 42 formed at the lower end rear side of each side leg portion of the seal fixing plate 30. The length of the under seal 32 is comparable to the whole length of the slider 2. The seal member 53 is formed by molding an elastic material, such as a rubber or a plastic. A protruding lip L4 is provided to slidably contact the side surface 1b of the guide rail 1. The protruding lip L4 is formed with a two-stage lip including a front stage seal lip L41 and a rear stage seal lip L42 spaced from the front stage seal lip L41 by a minute gap. Protruding lengths of the front stage seal lip L41 and the rear stage seal lip L42 are different from each other by a small size difference of Δl.

Figure 11:
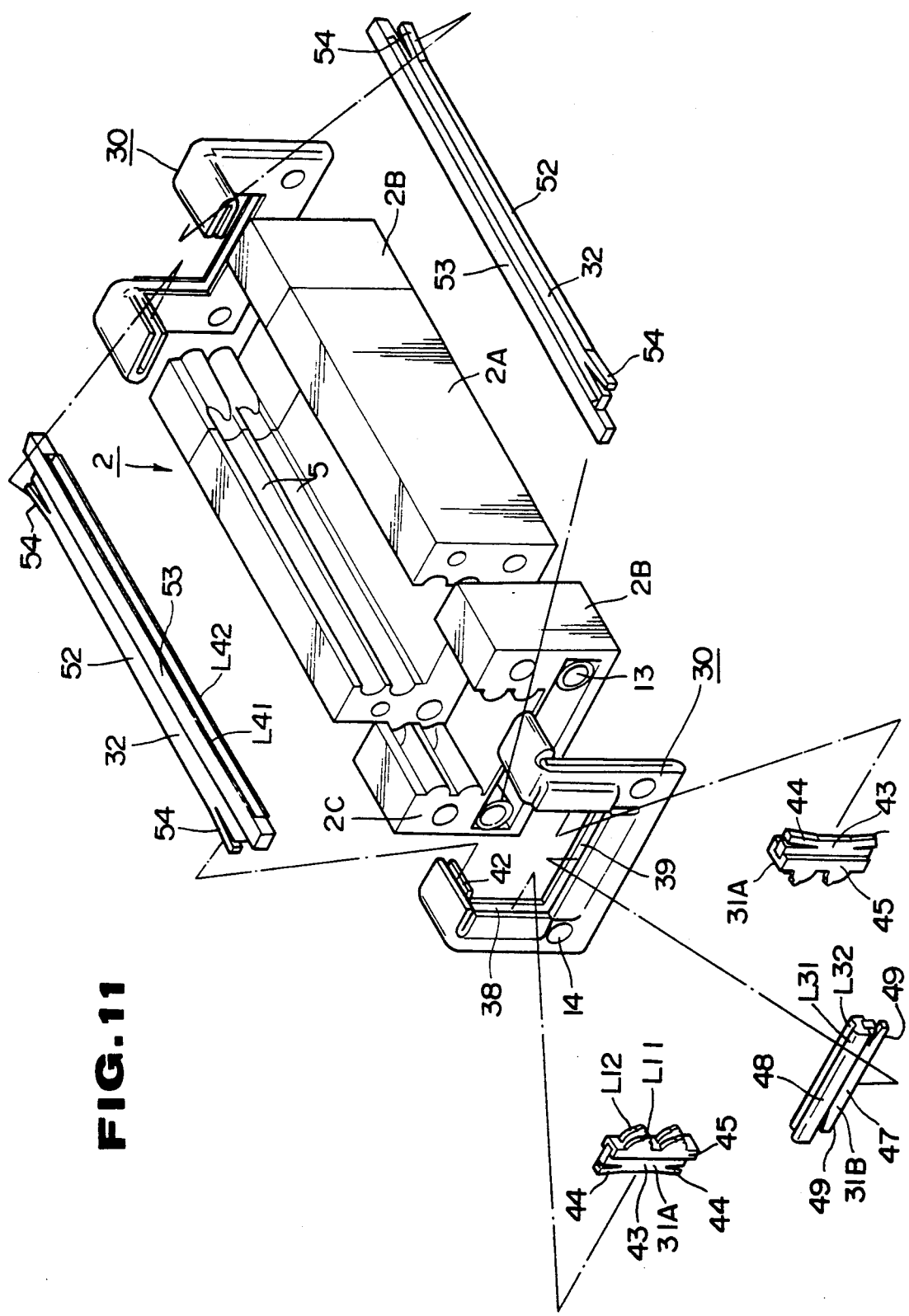
FIG. 11 is an exploded perspective view illustrating a way of attaching each seal to the fixing plate.

FIG. 11 illustrates a way of mounting the rail side surface side seals 31A, the rail upper surface side seal 31B, and the under seals 32. First, the seal holding plate 47 of the rail upper surface side seal 31B is inserted into the seal sandwiching gap 39 of the seal fixing plate 30. Next, the seal holding plate 43 of each rail side surface side seal 31A is inserted into the corresponding seal sandwiching gap 38 of the seal plate 30 so that the pair of the rail side surface side seals 31A are mounted on the seal fixing plate 30.

The seal fixing plate 30 is then fixed with screws to an end surface 2c of the end cap 2B which is attached to one end of the slider 2. The other of the pair of seal fixing plates 30 is also fixed to the other end cap 2B in the same manner. Lastly, opposite ends of the seal holding plate 52 of the under seal 32 are respectively inserted into the under seal sandwiching gaps 42 which are provided respectively at the lower end rear sides of the pair of seal fixing plates 30.

The operation or function of the dust seal device of the present invention will now be described.

Under a condition in which the slider 2 is mounted on the guide rail 1, the seal lips L2, L3 and L4 of the rail side surface side seals 31A, the rail upper surface side seal 31B, and the under seals 32 are respectively elastically pressed against the surfaces of the guide rail 1 to be sealed by elastic forces exerted by the spring portions 45, 49 and 54. As a result, each of the seals 31A, 31B and 32 is applied with a constant pressure preload. Since the constant pressure preload is not reduced to zero even when the seal members 44, 48 and 53 are worn, the period during which the sealing effect is adequately functioning can be extended to a great extent as compared with the prior art in which the rubber elasticity alone is used for sealing force.

During a period in which the wear of the seal members is small, the amounts of protrusion of the lips are large. Accordingly, the front stage seal lips L11, L31 and L41 which are slidably in contact with the surfaces to be sealed under the preload function as wiper seals to completely wipe the surfaces to be sealed. On the other hand, the rear stage seal lips L12, L32 and L42 whose amounts of lip protrusion are small face the surfaces to be sealed with a minute gap therebetween and, thus, function as non-contact labyrinth seals.

Under a bad environment in which the wear of the front stage seal lips L11, L31 and L41 is fast, both of the front stage seal lips L11, L31 and L41 and the rear stage seal lips L12, L32 and L42 will function as wiper seals after a short period of use. Thus, in this case, a sealing effect two times larger will be obtained as compared with one-stage sealing.

The side seal is not a unitary member, as is the case in the prior art, since the side seal is separated into the pair of rail side surface side seals 31A, Furthermore, since the under seals 32 are also separate members, even when size errors are present between the ball rolling grooves 3 of the guide rail 1, or between the upper surface 1a of the guide rail 1 and the ball rolling grooves 3, such size errors can be absorbed by each of the seals 31A, 31B and 32. As a result, the occurrence of non-uniform sealing is reduced.

Since the mounting of the seals is achieved in a single operation, no rivetting work is necessary as in the prior art. Furthermore, there is no need to form the under seal fixing bores in the lower surface of the slider main body 2A. In addition, the demounting of the seals is also achieved in a single demounting operation such that replacement of the seals is very easy.

The shape of the rail side surface side seals 31A, the rail upper surface side seal 31B, and the under seal 32 is simplified such that manufacture is easy.

Since the under seal 32 can be formed to have a length to cover the entire length of the slider between the opposite ends of both the end caps 2B, complete sealing can be achieved including sealing of opposite end portions of the slider 2.

FIG. 12 to 14 show a second embodiment of the present invention.

In this embodiment, the shape of the spring portions corresponding to the spring portions 44, 49, and 54 of the rail side surface side seals 31A, the rail upper surface side seal 31B, and the under seal 32 is different from that in the first embodiment. In this embodiment, the spring portions 56 of the rail side surface side seals 31A, the rail upper surface side seal 31B, and the under seal 32 are respectively formed by making long cuts 57 at one end portion along a long side of seal holding plates 43, 48, and 52. The length of the cut 57 is made long enough to almost reach the other end of the long side, with a small continuous portion 58 remaining in each of the seals. The cut piece is curved outwardly so as to expand outwardly in an arc shape.

The operation and function of the spring portion 56 are the same as that in the first embodiment.

FIGS. 15 to 17 show a third embodiment of the present invention.

In this embodiment, the shape of the spring portions corresponding to the spring portions 44, 49, and 54 of the rail side surface side seals 31A, the rail upper surface side seal 31B, and the under seal 32 is different from that in the first embodiment. In this embodiment, the spring portions 60 of the rail side surface side seals 31A, the rail upper surface side seal 31B, and the under seal 32 are respectively formed first, by cutting out opposite end portions of a long side of seal holding plates 43, 48, and 52 to a certain length and, then, long cuts 61 are made in the remaining portions along the long side. The length of the cuts 61 is selected so that small continuous portions 62 remain at the center portions of the seals. The cut piece is turned outwardly as shown in FIGS. 15 and 16, or curved to expand outwardly in an arc as shown in FIG. 17.

The operation and function of the spring portions 60 are the same as that in the first and second embodiments.

In each of the above embodiments, both the side seal and the under seal are mounted through the seal fixing plate. However, if it is required to seal only one side, either one of the seals may be mounted through the seal fixing plate.

Furthermore, in all of the embodiments of the present invention, although the linear guide apparatus has been described as including a guide rail 1 having two rows of ball rolling grooves 3 in each side thereof and a slider 2 having two rows of ball rolling grooves in one inner side thereof, thus requiring four rows of ball trains, the present invention is also applicable to other linear guide apparatuses having a different number of ball rows or using rollers equivalent to the balls.

As described in the foregoing, in the present invention, the side seals and the under seals in the linear guide apparatus are applied with a constant pressure preload exerted by the elasticity of springs as contrasted to the elasticity of rubber so that the seals are pressed against the surfaces to be sealed. As a result, it is possible to prevent the early deterioration of the sealing function due to wear of rubber and, also, to absorb any dimensional errors. In addition, the mounting and demounting of the side seals and the under seals is easy and reliable.

What is claimed is:

1. A dust seal device of a linear guide apparatus, wherein the linear guide apparatus includes a guide rail extending axially and having ball rolling grooves respectively formed in both side surfaces thereof and a slider movably straddling the guide rail, the slider including a slider main body having ball rolling grooves respectively opposing the ball rolling grooves of the guide rail and formed in inner surfaces of side walls thereof, the slider main body further having through bores as ball return passages formed respectively in the side walls thereof in parallel to the ball rolling grooves of the slider main body, a pair of end caps respectively joined to opposite ends of the slider main body, each of the end caps having a pair of curved paths respectively bringing corresponding ones of the ball return passages into communication with corresponding ones of the ball rolling grooves, and a plurality of balls rollably inserted into the opposing ball rolling grooves, the dust seal device comprising:

a pair of side seals for sealing front and rear openings of gaps between the slider and the guide rail;

a pair of under seals for sealing lower openings of the gaps between the slider and the guide rail; and a pair of seal fixing plates respectively attached to front and rear end surfaces of the end caps, each of the seal fixing plates having a seal sandwiching gap facing a surface of the guide rail to be sealed, at least one pair of the pair of side seals and the pair of under seals being attached respectively to the pair of seal fixing plates, the at least one pair of the side seals and the under seals attached to the seal fixing plates including a seal holding plate, a seal member secured to one edge of the seal holding plate, and a spring portion formed on the other edge of the seal holding plate for applying a constant pressure preload to the seal member, wherein the seal holding plate of the at least one of the pair of the side seals and the under seals is inserted into the seal sandwiching gap of the seal fixing plate so that the at least one pair of side seals and the pair of under seals are attached to the end caps through the seal fixing plates.

2. The dust seal device of a linear guide apparatus according to claim 1 wherein each of the side seals and the under seals has a lip portion consisting of two stage seal lips, the protruding lengths of the two stage seal lips toward a surface to be sealed being different from each other.

* * * * *